United States Patent
Blasco Allue et al.

(10) Patent No.: US 8,386,754 B2
(45) Date of Patent: Feb. 26, 2013

(54) RENAMING WIDE REGISTER SOURCE OPERAND WITH PLURAL SHORT REGISTER SOURCE OPERANDS FOR SELECT INSTRUCTIONS TO DETECT DEPENDENCY FAST WITH EXISTING MECHANISM

(75) Inventors: Conrado Blasco Allue, Austin, TX (US); David James Williamson, Austin, TX (US); James Nolan Hardage, Austin, TX (US); Glen Andrew Harris, Austin, TX (US); Robert Gregory McDonald, Austin, TX (US)

(73) Assignee: ARM Limited, Cambridge (GB)

( * ) Notice: Subject to any disclaimer, the term of this patent is extended or adjusted under 35 U.S.C. 154(b) by 917 days.

(21) Appl. No.: 12/457,905

(22) Filed: Jun. 24, 2009

(65) Prior Publication Data
US 2010/0332805 A1 Dec. 30, 2010

(51) Int. Cl.
*G06F 9/38* (2006.01)
(52) U.S. Cl. .... 712/216; 712/217; 712/219; 712/E9.045
(58) Field of Classification Search .................. None
See application file for complete search history.

(56) References Cited

U.S. PATENT DOCUMENTS

| | | | | |
|---|---|---|---|---|
| 6,094,719 | A * | 7/2000 | Panwar | 712/216 |
| 7,340,590 | B1 * | 3/2008 | Sugumar et al. | 712/216 |
| 7,937,561 | B2 * | 5/2011 | Col et al. | 712/208 |
| 2010/0274992 | A1 * | 10/2010 | Chou et al. | 712/216 |

OTHER PUBLICATIONS

Liu et al., "Register Renaming for x86 Superscalar Design", *IEEE*, Feb. 2009, pp. 336-343.

* cited by examiner

*Primary Examiner* — Kenneth Kim
(74) *Attorney, Agent, or Firm* — Nixon & Vanderhye P.C.

(57) ABSTRACT

An out-of-order renaming processor is provided with a register file within which aliasing between registers of different sizes may occur. In this way a program instruction having a source register of a double precision size may alias with two single precision registers being used as destinations of one or more preceding program instructions. In order to track this data dependency the double precision register may be remapped into a micro-operation specifying two single precision registers as its source register. In this way, scheduling circuitry may use its existing hazard detection and management mechanisms to handle potential data hazards and dependencies. Not all program instructions having such data hazards between registers of different sizes are handled by this source register remapping. For these other program instructions a slower mechanism for dealing with the data dependency hazard is provided. This slower mechanism may, for example, be to drain all the preceding micro-operations from the execution pipelines before issuing the micro-operation having the data hazard.

15 Claims, 5 Drawing Sheets

Micro-operation Format

FIG. 5

RENAMING WIDE REGISTER SOURCE OPERAND WITH PLURAL SHORT REGISTER SOURCE OPERANDS FOR SELECT INSTRUCTIONS TO DETECT DEPENDENCY FAST WITH EXISTING MECHANISM

BACKGROUND OF THE INVENTION

1. Field of the Invention

This invention relates to the field of data processing systems. More particularly, this invention relates to data processing systems including a register file supporting different sizes of source register such that aliasing between registers can occur and further including scheduling circuitry that detects data dependency hazards between micro-operations to be issued.

2. Description of the Prior Art

It is known to provide data processing systems with register files that may be addressed using registers of different sizes. For example, the register file of the ARM VFP (vector floating point) architecture provides a single register file shared by single-precision and double-precision instructions such that two single precision registers can map to one double precision register. This can create potential data dependencies (hazards) between single-precision register producers and double-precision register consumers. These dependencies can be managed relatively straight forwardly in an in-order processor but become harder to efficiently manage in an out-of-order processor, particularly one employing register renaming.

It is known from "Register Renaming For x86 Superscalar Design" by Chang-Chung Liu et al (IEEE 1996 International Conference On Parallel And Distributed Systems, Proceedings, page 336-343) to provide a mechanism whereby multiple rename tags at the smallest granularity with which the register file can be addressed are utilized for all instructions. In this way, any data dependency between one or more source registers and a larger destination register may be tracked and managed. Such an approach suffers from a disadvantage that it significantly increases the amount of state data associated with tracking data sources which must be managed within the processor and passed along the pipeline. Liu also discloses a technique whereby source registers are tracked until only one remains outstanding for an instruction at which point the instruction may be controlled based upon the availability of this one outstanding source register.

An alternative approach may be to detect a data hazard due to aliasing within the register file and when such hazards are detected for an instruction to be issued, then stall that instruction until the potential hazard has been removed. This approach is relatively simple to implement, but has a potentially significant adverse performance impact. While it might be considered that it would be rare to encounter a sequence of micro-operations in which a source register for a second (following) micro-operation depends on a destination register for a first (preceding micro-operation where these source and destination registers differ in size (since these two different sizes would typically indicate different, incompatible data types), however in practice it is found that such code sequences do occur within legitimate code (e.g. state saving and restore upon a context switch) and accordingly such a simple approach has too great an impact upon real life performance.

SUMMARY OF THE INVENTION

Viewed from one aspect the present invention provides an apparatus for processing data, said apparatus comprising: a register file addressable as registers having a plurality of different sizes including a first register size and a second register size, said first register size being an integer multiple of said second register size and said register file is addressable so as to permit aliasing between registers of said first size and registers of said second size;

an instruction decoder configured to be responsive to a stream of program instructions of an instruction set to generate a decoded stream of micro-operations;

scheduling circuitry configured to be responsive to said decoded stream of micro-operations to detect data dependency between micro-operations whereby hazard data within said register file written as a destination operand register of a first micro-operation is at least part of a source operand register of a second micro-operation and to generate an issued stream of micro-operations responsive to said data dependency; and execution circuitry configured to be responsive to said issued stream of micro-operations to perform processing operations corresponding to said stream of program instructions; wherein said instruction decoder is configured to be responsive to a program instruction specifying a source operand register of said first size and from a first group of program instructions of said instruction set to generate one or more corresponding micro-operations specifying said source operand register as one or more registers of said second size within said register file;

said scheduling circuitry is configured to be responsive to data dependency between a destination register of said second size and a source register of said second size to generate said stream of issued micro-operations to permit issue of said second micro-operation prior to generation of said hazard data by said first micro-operation;

said instruction decoder is configured to be responsive to a program instruction specifying a source operand register of said first size and from a second group of program instructions of said instruction set to generate one or more corresponding micro-operations specifying said source operand register as a register of said first size within said register file; and said scheduling circuitry is configured to be responsive to data dependency between a destination register of said second size and a source register of said first size to generate said stream of issued micro-operations not to permit issue of said second micro-operation prior to generation of said hazard data by said first micro-operation.

The present technique recognizes that while data dependencies between registers of different sizes within the register file can occur and must be dealt with whenever they arise, in practice it is possible to provide a fast mechanism for dealing with the common program instructions which legitimately give rise to such data dependencies without an excessive hardware overhead whilst retaining an effective fall-back mechanism for the remainder of program instructions which can give rise to such data dependencies so that these are correctly handled (even if at low performance) upon the relatively rare occasions at which they occur. Thus, the technique provides a fast mechanism for dealing with this form of data hazard which is targeted at the program instructions most likely to occur and be performance critical in real life (the first set of program instructions) while the remaining program instructions which can give rise to such data dependencies (the second set of program instructions) are deal with via a different low-overhead, but slower mechanism.

The slower mechanism for dealing with the data hazard can take a variety of different forms. In one form the scheduling circuitry does not issue the second micro-operation until the hazard data is written to the register file. Tracking the actual writing of the hazard data to the register file does however incur a circuit overhead which may not be acceptable/justified in some circumstances.

Another mechanism for dealing with the data hazard is to not issue the second micro-operation until all preceding micro-operations within the issued stream of micro-operations have completed execution. This effectively enforces a policy whereby when the data hazard is detected the pipelines will be completely drained before the micro-operation for which the hazard was detected is issued. This is relatively simple to implement, but has a significant performance impact when invoked.

The difference in size between the first size and the second size can arise for a variety of different reasons. However, one particular reason is when the first size is a double precision floating point size and the second size is a single precision floating point size.

The present technique can be used to good effect when the scheduling circuitry performs register renaming between register specifiers of a set of architectural registers as used within the program instructions and register specifiers of a set of physical registers as used by the issued stream of micro-operations. Tracking the dependencies between a large number of such-physical registers would become particularly onerous if it were performed for all program instructions at the finest level of source register granularity, e.g. an operation may have two 128-bit source registers and yet the finest granularity may be 32-bit registers resulting in a need to track up to eight potential 32-bit destination registers of preceding instructions upon which said 128-bit source registers may be dependent.

The present technique may also be used to advantageous effect within an out-of-order processor.

The register file may be addressable so as to permit aliasing between registers of the first size and registers of the second size both deliberately as a consequence of a desired operation to be coded and more accidentally as a consequence of interaction between different routines which address the register file using registers of different sizes.

The circuit overhead of providing the fast mechanism can be reduced when the first group of program instructions are such as to generate micro-operations having a total number of source operand registers that is equal or less than the maximum number of source operand registers of micro-operations generated from program instructions of the second group. The second group of program instructions will not use the register remapping technique of the fast mechanism and yet may have a relatively large number of source registers specified depending upon the nature of the data processing operation required by that program instruction of the second group. If the program instructions of the first group have the characteristic that even using the register remapping that is performed to address the data hazard with a fast mechanism they do not exceed the total number of source operand registers that are potentially used by the second group of instructions, then the overall circuit resource needed to track this additional state will not be increased above that which already has to be provided in any case to support the non-hazard operation of the second group of program instructions.

Viewed from another aspect the present invention provides a method of processing data, said method comprising the steps of:

storing data within a register file addressable as registers having a plurality of different sizes including a first register size and a second register size, said first register size being an integer multiple of said second register size and said register file is addressable so as to permit aliasing between registers of said first size and registers of said second size;

in response to a stream of program instructions of an instruction set, generating a decoded stream of micro-operations;

in response to said decoded stream of micro-operations, detecting data dependency between micro-operations whereby hazard data within said register file written as a destination operand register of a first micro-operation is at least part of a source operand register of a second micro-operation and to generated an issued stream of micro-operations responsive to said data dependency; and in response to said issued stream of micro-operations, performing processing operations corresponding to said stream of program instructions; wherein in response to a program instruction specifying a source operand register of said first size and from a first group of program instructions of said instruction set, said step of generating a decoded stream of micro-operations generates one or more corresponding micro-operations specifying said source operand register as one or more registers of said second size within said register file;

in response to data dependency between a destination register of said second size and a source register of said second size said step of generating said stream of issued micro-operations generates said stream of issued micro-operations to permit issue of said second micro-operation prior to generation of said hazard data by said first micro-operation;

in response to a program instruction specifying a source operand register of said first size and from a second group of program instructions of said instruction set said step of generating said stream of decoded micro-operations generates one or more corresponding micro-operations specifying said source operand register as a register of said first size within said register file; and in response to data dependency between a destination register of second first size and a source register of said first size said step of generating said stream of issue micro-operations generates said stream of issued micro-operations not to permit issue of said second micro-operation prior to generation of said hazard data by said first micro-operation.

Viewed from a further aspect the present invention provides an apparatus for processing data, said apparatus comprising:

register file means addressable as registers having a plurality of different sizes including a first register size and a second register size, said first register size being an integer multiple of said second register size and said register file is addressable so as to permit aliasing between registers of said first size and registers of said second size;

instruction decoder means for generating a decoded stream of micro-operations configured in response to a stream of program instructions of an instruction set;

scheduling means responsive to said decoded stream of micro-operations for detecting data dependency between micro-operations whereby hazard data within said register file written as a destination operand register of a first micro-operation is at least part of a source operand register of a second micro-operation and for generating an issued stream of micro-operations responsive to said data dependency; and execution means responsive to said issued stream of micro-operations for performing processing operations corresponding to said stream of program instructions; wherein said instruction decoder means is responsive to a program instruction specifying a source operand register of said first size and from a first group of program instructions of said instruction set to generate one or more corresponding micro-operations specifying said source operand register as one or more registers of said second size within said register file;

said scheduling means is responsive to data dependency between a destination register of said second size and a source register of said second size to generate said stream of issued micro-operations to permit issue of said second micro-operation prior to generation of said hazard data by said first micro-operation;

said instruction decoder means is responsive to a program instruction specifying a source operand register of said first size and from a second group of program instructions of said instruction set to generate one or more corresponding micro-operations specifying said source operand register as a register of said first size within said register file; and said scheduling means is responsive to data dependency between a destination register of said second size and a source register of said first size to generate said stream of issued micro-operations not to permit issue of said second micro-operation prior to generation of said hazard data by said first micro-operation.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
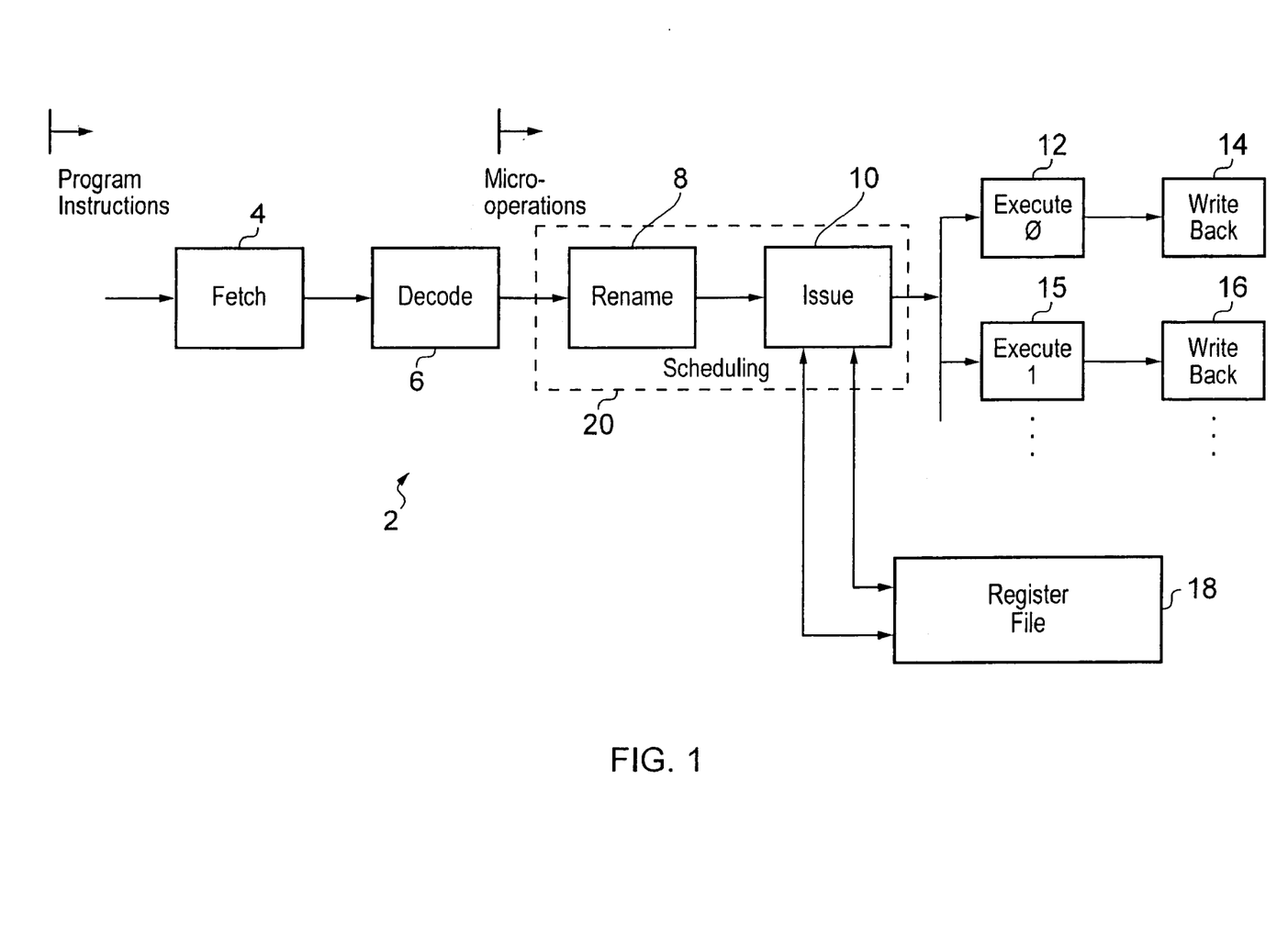
FIG. 1 schematically illustrates a portion of a data processing apparatus including an instruction processing pipeline and a register file.

FIG. 1 schematically illustrates a portion of a data processing apparatus 2 including an instruction pipeline formed of fetch circuitry 4, decode circuitry 6, rename circuitry 8, issue circuitry 10, multiple execution circuitry 12, 15 and multiple write back circuitry 14, 16 (the write back circuitry in other embodiments may be part of the issue circuitry). The, execute circuitry 12, 15 and the write back circuitry 14, 16 provide respective execution pipeline stages such as an ALU pipeline, a load/store pipeline etc. The execute circuits 12, 15 are coupled to a register file 18 which stores operand data being manipulated. The operand data may be source operand data and/or destination operand data. Typically a program instruction will specify a data processing operation that reads data held within one or more source registers within the register file, manipulates that data and then writes it back into one or more destination registers within the register file 18.

In operation, program instructions are fetched from a memory (not illustrated) by the fetch circuit 4. These fetched program instructions are then decoded by the decoder circuitry 6 to form micro-operations. Thus, a stream of program instructions is mapped into a stream of micro-operations. The processor illustrated in FIG. 1 is an out-of-order processor which utilises register renaming. Out-of-order processing techniques and register renaming techniques are themselves known in the processor field and will not be described in detail herein. The renaming circuitry 8 serves to rename architectural registers to physical registers with the register file 18. The architectural register is a register as specified within a program instruction given the programmer's view of the architecture of the processor 2. The physical register is the actual register within the register file 18 which serves as the source or destination register corresponding to the architectural register. The renaming circuitry 8 can detect data hazards whereby there is a data dependency between different instructions, e.g. the output of one instruction being the input of another instruction. Register renaming is a useful technique for increasing parallelism and supporting out-of-order instruction execution when such data dependencies are not present. When such data dependencies are present, the renaming circuitry 8 or the issue circuitry 10 can serve to delay the issue of a micro-operation into the execution pipelines 12, 14, 15, 16 until the data dependency can be resolved (e.g. by result forwarding or completion of the earlier instruction). In order to track these dependencies, state data must be associated with the micro-operations indicating which source registers they consume and which destination registers they generate. The hardware overhead associated with the provision of this state data may be considerable and accordingly it is desirable not to increase the number of source registers being tracked. It is for this reason that the naive approach of tracking all source registers at the minimum granularity size for all program instructions whilst providing a relatively fast solution to dealing with data dependencies does incur a disadvantageously large circuit overhead.

The renamed micro-operations with their new register names issued from the rename circuitry 8 are received by the issue circuitry 10 and when an appropriate execution pipeline 12, 14, 15, 16 becomes available are issued therein providing their data hazards have resolved or can be resolved.

It will be appreciated that the portion of the instruction pipeline constituted by the renaming circuitry 8 and the issue circuitry 10 may be considered to form scheduling circuitry 20 and together act to control the scheduling of micro-operations for issue into the execution pipelines 12, 14, 15, 16.

Figure 2:
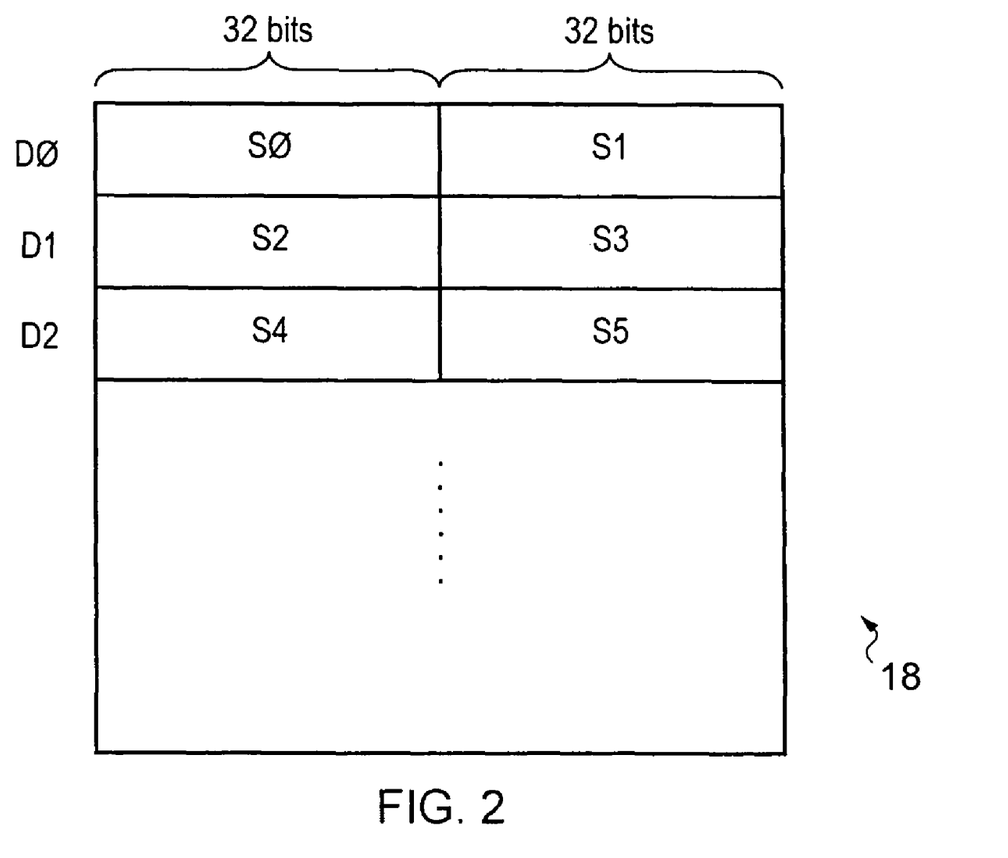
FIG. 2 schematically illustrate a register file addressable to provide source registers of different sizes.

FIG. 2 schematically illustrates the register file 18. This register file 18 may be addressed in this example embodiment as a plurality of single precision registers S0, S1, . . . each comprising 32-bits. Alternatively, the same data can be addressed as double-precision registers D0, D1, . . . each containing 64-bits. In this way, aliasing can occur within the register file 18 whereby the same data within the register file 18 may be accessed using different registers of different sizes. In this example the double precision registers D0, D1 have the first size and the single precision registers S0, S1 have the second size. The registers of the first size are a multiple in size of the registers of the second size.

Figure 3:
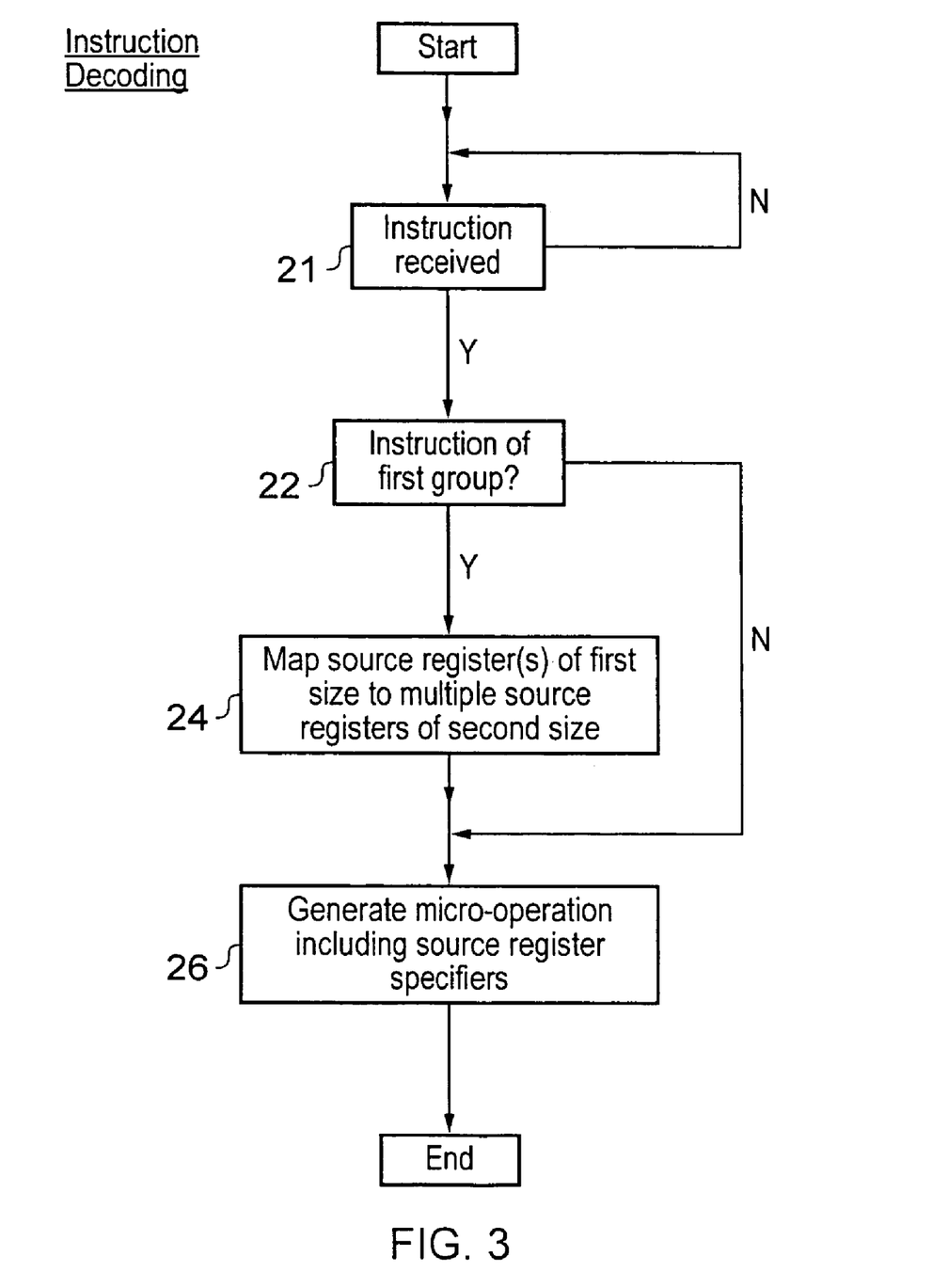
FIG. 3 is a flow diagram schematically illustrating one aspect of instruction decoding so as to map source registers of a first size to multiple source registers of a second size.

FIG. 3 schematically illustrates a portion of the processing performed by the decode circuitry 6. FIG. 3 is a flow diagram which necessarily illustrates the operation as sequential. It will be appreciated by those in this technical field that such operations may in practice be performed partially or wholly in parallel. It will also be appreciated that many other functions are typically performed by the decode circuitry 6.

At step 21 processing waits until a program instruction is received. When a program instruction is received, step 22 identifies whether the program instruction is a member of the first group of program instructions of the instruction set of the processor 2. Instructions of the first group are instructions where the a data hazard consequential to register aliasing can arise and where it is desired to provide the fast mechanism for dealing with such a data hazard. If the program instruction is a member of the first group, then processing proceeds to step 24 where the source register(s) of the first size (e.g. double precision registers) are mapped to multiple source registers of the second size (e.g. single precision registers). Mapping the source registers from a double precision size down to a single precision size in this way permits the dependency of the source registers of the program instruction of the first group to be properly tracked and managed at the granularity of the second size of register. The instructions of the first group which occur frequently in real life are normally ones in which a relatively small number of source registers are employed and accordingly doubling the number of source registers being tracked as a consequence of the mapping performed at step 24 does not exceed the capabilities for tracking source registers which are already in place within the scheduling circuitry 20 to handle the worst-case of the other instructions.

If the determination at step 22 was that the program instruction received is not an instruction of the first group, then it will be an instruction of the second group and step 24 is bypassed. At step 26 a micro-operation including source register specifiers derived from those within the original program instruction or those provided by step 24 are generated.

Figure 4:
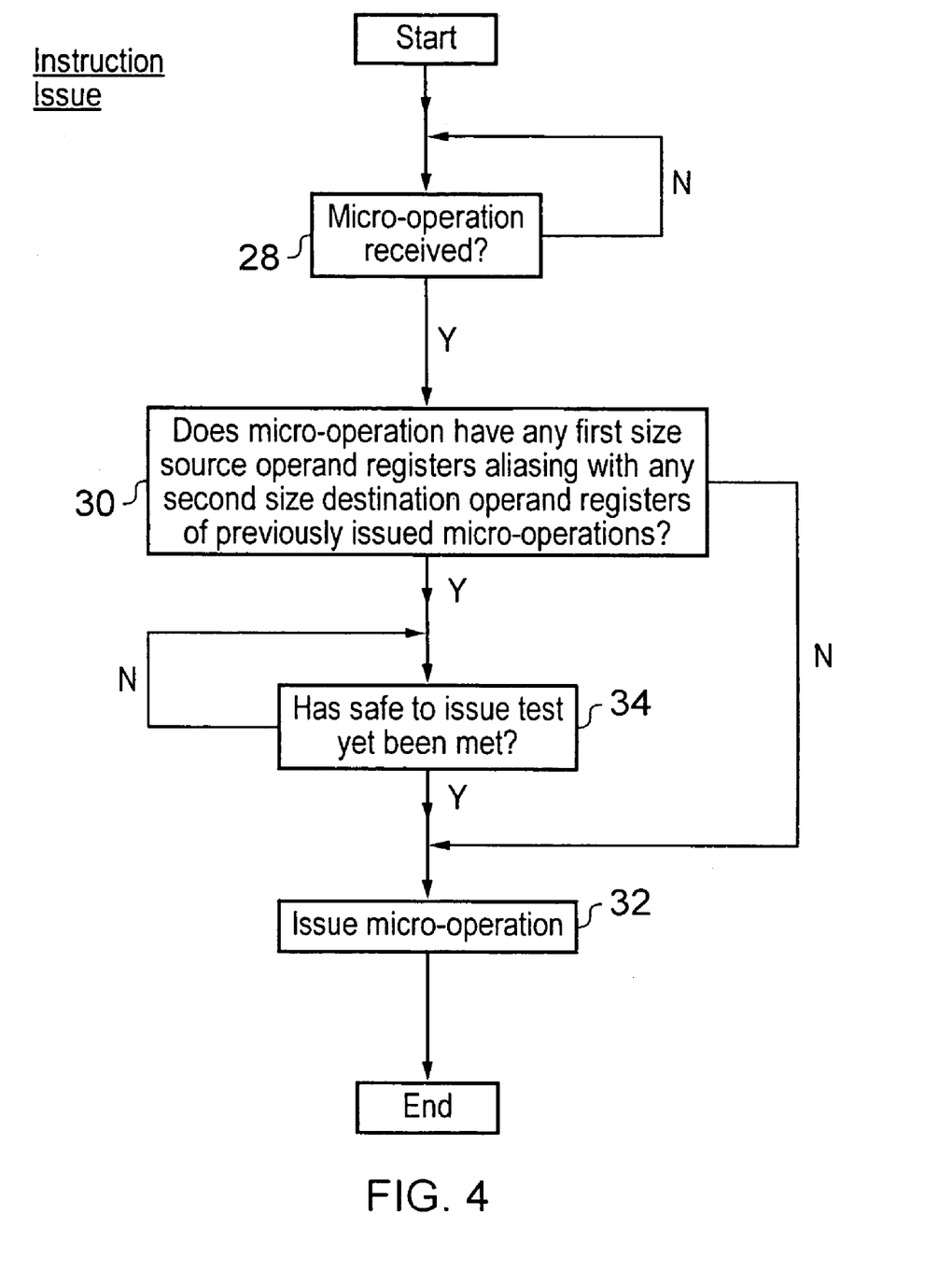
FIG. 4 is a flow diagram schematically illustrating operation of instruction issue taking into account the slow mechanism for dealing with data hazards as discussed above.

FIG. 4 is a flow diagram schematically illustrating a portion of the operation of the issue circuitry 10. As for FIG. 3, it will be appreciated that FIG. 4 as a flow diagram necessarily illustrates the operations as performed sequentially whereas in practice many operations of the issue circuitry 10 may be provided wholly or partially parallel. The ordering of operations may also be modified.

At step 28 the issue circuitry 10 waits for a micro-operation to be received. At step 30 the issue circuitry 10 serves to detect any hazard data associated with the received micro-operation whereby the micro-operation specifies a source operand register of the first size which aliases with one or more second size destination operand registers of previously issued micro-operations which are being tracked as "in-flight" by the issue circuitry 10. This type of hazard detection will be familiar to those in the technical field, e.g. using a register renaming mechanism having a rename table to track micro-operations "in flight"; in this case the rename table can indicate that a double precision source corresponds to (aliases with) at least one single precision destination that has yet to be written. If such a hazard is not detected, then processing proceeds to step 32 where the micro-operation is issued to the appropriate execution pipeline 12, 14, 15, 16. If a hazard is detected at step 30, then processing proceeds to step 34 where the issue circuitry 10 waits until the data hazard has been removed. In some embodiments the issue circuitry 10 may wait until all preceding issued micro-operations have drained from the execution pipelines 12, 14, 15, 16 as this should mean that the source data has properly been written back to the register file 18. Alternatively, the issue circuitry 10 may take a more active approach and monitor whether the source data for which a hazard has been detected has been written back to the register file 18. In either case the mechanism for dealing with the data hazard which is represented by the processing step 34 is relatively slow compared to the more aggressive scheduling which can be achieved when source registers of the first size have been mapped to multiple source registers of the second size by step 24 of FIG. 3 when the program instructions concerned are members of the first group for which the fast mechanism is supported.

Figure 5:
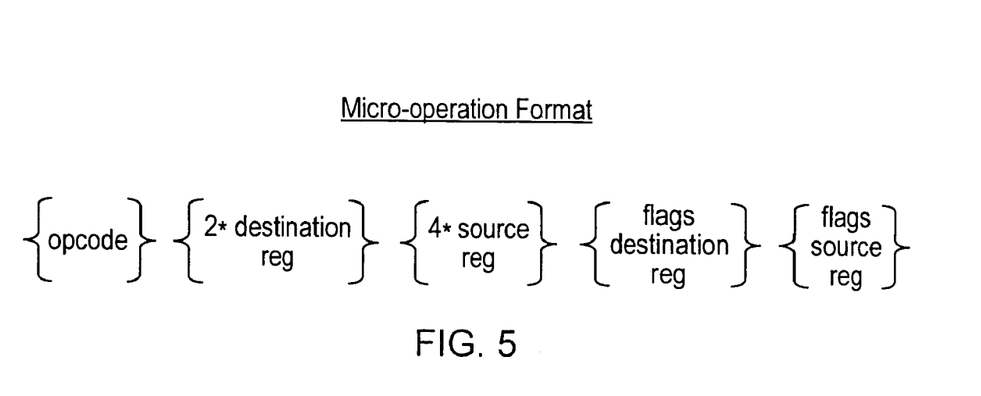
FIG. 5 schematically illustrates a format of a micro-operation within the stream of micro-operations.

FIG. 5 schematically illustrates the format of micro-operations generated by the decode circuitry 6. These micro-operations include an opcode, up to two destination register specifiers, up to four source register specifiers, an operational flags destination register and an optional flag source register. It will be seen that in accordance with this micro-operation format the maximum number of source register specifiers supported is 4. Accordingly, the program instructions of the first group should not exceed a requirement for four source register specifiers even when the source registers of the first size have been mapped into multiple source registers of the second size. As an example, the maximum number of double precision source registers which may be specified would be two as these would then map to four single precision source registers. In this circumstance it would not be possible to have any further source registers without exceeding the capabilities of the micro-operation format illustrated in FIG. 5.

A number of scenarios illustrating relatively common instructions of the first group which can arise during real life execution of ARM processors is given in the following description. It will be appreciated that these specific examples relate to aspects of the ARM processor architecture but that similar examples are present within other processor architectures.

Scenario One—Store Multiples:
VADD.F32 s0,s2,s3;; s0 is renamed as v12
VSUB.F32 s1,s4,s5;; s1 is renamed as v7
VSTMIA.F64 r12!, {d0-d3};; how is d0 renamed?
D0 needs to be named such that VSTM waits for both VADD & VSUB to complete. What register specifier should d0 get? In an out-of-order machine we don't know if VADD or VSUB is going to complete first. (Rename occurs before execution.) We could give d0 both names (v7 & v12) but that is not a good solution because (1) it adds state to the machine (it needs to keep two rename tags per source) and (2) it makes the rename process more complex.

The chosen solution is to sequence VSTMIA.F64 r12!, {d0-d3} as if it were VSTMIA.F32 r12!,{s0,s1}. This doesn't add any new state since the micro-ops are already capable of handling up to four sources, with their four source rename tags. The store buffer (a.k.a. write buffer) determines how to reassemble s0 & s1 into a double-word before updating the cache. This, again, is already supported for handling instructions like ARM integer STMIA.

Note: The above sequence is a sequence that the ARM RVCT compiler may generate. Why does the compiler use VSTMIA.F64 instead of a VSTMIA.F32? Two scenarios: (1) Register save/restore (function prologue/epilogue). In this case the compiler cannot know what's in the registers so it chooses to use VSTMIA.F64 since this is more likely to be higher performance than VSTMIA.F32 across a range of implementations. (2) For similar reasons, block copies (like memcpy) use VSTMIA.F64.

Scenario Two—Neon scalars:
VLDR s4,[pc,#824]
VDUP.32 q0,d2[0]
The ARM RVCT compiler may load Neon scalars by using single-precision VLDR instructions. Therefore, the VDUP.32 instruction in the example above cannot read d2 as a source without introducing another potential multiple-producer/single-consumer scenario.

Instead, the VDUP.32 instruction is sequenced as reading s4.

This solution applies to all Neon instructions that read scalars as sources.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a register file addressable as registers having a plurality of different sizes including a first register size and a second register size, said first register size being an integer multiple of said second register size and said register file is addressable so as to permit aliasing between registers of said first size and registers of said second size;
   an instruction decoder configured to be responsive to a stream of program instructions of an instruction set to generate a decoded stream of micro-operations;
   scheduling circuitry configured to be responsive to said decoded stream of micro-operations to detect data dependency between micro-operations whereby hazard data within said register file written as a destination operand register of a first micro-operation is at least part of a source operand register of a second micro-operation and to generated an issued stream of micro-operations responsive to said data dependency; and
   execution circuitry configured to be responsive to said issued stream of micro-operations to perform processing operations corresponding to said stream of program instructions; wherein
   said instruction decoder is configured to be responsive to a program instruction specifying a source operand register of said first size and from a first group of program instructions of said instruction set to generate, before said scheduling circuitry detects any data dependence for said program instruction, one or more corresponding micro-operations for execution by said execution circuitry and specifying said source operand register as one or more registers of said second size within said register file;
   said scheduling circuitry is configured to be responsive to data dependency between a destination register of said second size and a source register of said second size to generate said stream of issued micro-operations to permit issue of said second micro-operation prior to generation of said hazard data by said first micro-operation;
   said instruction decoder is configured to be responsive to a program instruction specifying a source operand register of said first size and from a second group of program instructions of said instruction set to generate, before said scheduling circuitry detects any data dependence for said program instruction, one or more corresponding micro-operations specifying said source operand register as a register of said first size within said register file; and
   said scheduling circuitry is configured to be responsive to data dependency between a destination register of said second size and a source register of said first size to generate said stream of issued micro-operations so as not to permit issue of said second micro-operation prior to generation of said hazard data by said first micro-operation.

2. Apparatus as claimed in claim 1, wherein when said scheduling circuitry detects data dependency between a destination register of said first size and a source register of said second size, said scheduling circuitry does not issue said second micro-operation until said hazard data has been written to said register file.

3. Apparatus as claimed in claim 1, wherein when said scheduling circuitry detects data dependency between a destination register of said first size and a source register of said second size, said scheduling circuitry does not issue said second micro-operation until all preceding micro-operations within said issued stream of micro-operations have completed execution.

4. Apparatus as claimed in claim 1, where said first size is a double precision floating point size and said second size is a single precision floating point size.

5. Apparatus as claimed in claim 1, wherein said scheduling circuitry is configured to perform register renaming between register specifiers of a set of architectural registers as used within said program instructions and register specifiers of a set of physical registers as used by said issued stream of micro-operations.

6. Apparatus as claimed in claim 1, wherein said apparatus comprises an out-of-order processor.

7. Apparatus as claimed in claim 1, wherein program instructions of said first group generate micro-operations having a total number of source operand registers that is equal or less than a maximum number of source operand registers of micro-operations generated from program instructions of said second group.

8. A method of processing data, said method comprising the steps of:
   storing data within a register file addressable as registers having a plurality of different sizes including a first register size and a second register size, said first register size being an integer multiple of said second register size and said register file is addressable so as to permit aliasing between registers of said first size and registers of said second size;
   in response to a stream of program instructions of an instruction set, generating a decoded stream of micro-operations;
   in response to said decoded stream of micro-operations, detecting data dependency between micro-operations whereby hazard data within said register file written as a destination operand register of a first micro-operation is at least part of a source operand register of a second micro-operation and to generated an issued stream of micro-operations responsive to said data dependency; and
   in response to said issued stream of micro-operations, performing processing operations corresponding to said stream of program instructions; wherein
   in response to a program instruction specifying a source operand register of said first size and from a first group of program instructions of said instruction set, said step of generating a decoded stream of micro-operations generates, before said step of detecting detects any data dependency for said program instruction, one or more corresponding micro-operations for controlling said step of performing processing operations specifying said source operand register as one or more registers of said second size within said register file;
   in response to data dependency between a destination register of said second size and a source register of said second size said step of generating said stream of issued micro-operations generates said stream of issued micro-operations to permit issue of said second micro-operation prior to generation of said hazard data by said first micro-operation;
   in response to a program instruction specifying a source operand register of said first size and from a second group of program instructions of said instruction set said step of generating said stream of decoded micro-operations generates, before said step of detecting detects any data dependency for said program instruction, one or more corresponding micro-operations specifying said source operand register as a register of said first size within said register file; and in response to data dependency between a destination register of said second size and a source register of said first size said step of generating said stream of issue micro-operations generates said stream of issued micro-operations so as not to permit issue of said second micro-operation prior to generation of said hazard data by said first micro-operation.

9. A method as claimed in claim 8, wherein when said step of detecting detects data dependency between a destination register of said first size and a source register of said second size and does not issue said second micro-operation until said hazard data has been written to said register file.

10. A method as claimed in claim 8, wherein when said step of detecting detects data dependency between a destination register of said first size and a source register of said second size and does not issue said second micro-operation until all preceding micro-operations within said issued stream of micro-operations have completed execution.

11. A method as claimed in claim 8, where said first size is a double precision floating point size and said second size is a single precision floating point size.

12. A method as claimed in claim 8, wherein said step of generating said stream of issued micro-operations performs register renaming between register specifiers of a set of architectural registers as used within said program instructions and register specifiers of a set of physical registers as used by said issued stream of micro-operations.

13. A method as claimed in claim 8, wherein said method is performed within an out-of-order processor.

14. A method as claimed in claim 10, wherein program instructions of said first group generate micro-operations having a total number of source operand registers that is equal or less than a maximum number of source operand registers of micro-operations generated from program instructions of said second group.

15. Apparatus for processing data, said apparatus comprising:

register file means addressable as registers having a plurality of different sizes including a first register size and a second register size, said first register size being an integer multiple of said second register size and said register file is addressable so as to permit aliasing between registers of said first size and registers of said second size;

instruction decoder means for generating a decoded stream of micro-operations configured in response to a stream of program instructions of an instruction set;

scheduling means responsive to said decoded stream of micro-operations for detecting data dependency between micro-operations whereby hazard data within said register file written as a destination operand register of a first micro-operation is at least part of a source operand register of a second micro-operation and for generating an issued stream of micro-operations responsive to said data dependency; and execution means responsive to said issued stream of micro-operations for performing processing operations corresponding to said stream of program instructions; wherein said instruction decoder means is responsive to a program instruction specifying a source operand register of said first size and from a first group of program instructions of said instruction set to generate, before said scheduling means detects any data dependency for said program instruction, one or more corresponding micro-operations for execution by said execution means specifying said source operand register as one or more registers of said second size within said register file;

said scheduling means is responsive to data dependency between a destination register of said second size and a source register of said second size to generate said stream of issued micro-operations to permit issue of said second micro-operation prior to generation of said hazard data by said first micro-operation;

said instruction decoder means is responsive to a program instruction specifying a source operand register of said first size and from a second group of program instructions of said instruction set to generate, before said scheduling means detects any data dependency for said program instruction, one or more corresponding micro-operations specifying said source operand register as a register of said first size within said register file; and said scheduling means is responsive to data dependency between a destination register of said second size and a source register of said first size to generate said stream of issued micro-operations so as not to permit issue of said second micro-operation prior to generation of said hazard data by said first micro-operation.

* * * * *